United States Patent
Sonnenberg et al.

(10) Patent No.: US 11,148,309 B2
(45) Date of Patent: Oct. 19, 2021

(54) RAZOR COMPONENTS WITH NOVEL COATING

(71) Applicant: The Gillette Company, Boston, MA (US)

(72) Inventors: Neville Sonnenberg, Newton, MA (US); Alison Fiona Stephens, Maidenhead (GB); Joia Kirin Spooner-Wyman, Jamaica Plain, MA (US)

(73) Assignee: The Gillette Company LLC, Boston, MA (US)

( * ) Notice: Subject to any disclaimer, the term of this patent is extended or adjusted under 35 U.S.C. 154(b) by 344 days.

(21) Appl. No.: 14/294,539

(22) Filed: Jun. 3, 2014

(65) Prior Publication Data

US 2014/0360021 A1    Dec. 11, 2014

Related U.S. Application Data

(60) Provisional application No. 61/831,329, filed on Jun. 5, 2013.

(51) Int. Cl.
*B26B 21/44* (2006.01)
*C09D 5/00* (2006.01)
(Continued)

(52) U.S. Cl.
CPC .............. *B26B 21/443* (2013.01); *B24B 1/00* (2013.01); *B26B 21/14* (2013.01);
(Continued)

(58) Field of Classification Search
CPC .......... C09D 5/00; C09D 5/16; B26B 21/443; B26B 21/4012; B26B 21/52; B26B 21/14; B26B 21/60; B26B 21/40; B24B 1/00
See application file for complete search history.

(56) References Cited

U.S. PATENT DOCUMENTS

| 3,811,189 A | * | 5/1974 | Sastri | ...................... B26B 21/54 |
| | | | | 30/346.53 |
| 3,894,337 A | * | 7/1975 | Jones | ...................... B26B 21/58 |
| | | | | 30/346.54 |

(Continued)

FOREIGN PATENT DOCUMENTS

| GB | 1050241 | 12/1966 |
| GB | 1050243 | 12/1966 |

(Continued)

OTHER PUBLICATIONS

PCT International Search Report With Written Opinion in corresponding Int'l appln. PCT/US2014/041037 dated Oct. 15, 2014.

*Primary Examiner* — Jonathan G Riley
(74) *Attorney, Agent, or Firm* — Joanne N. Pappas; Kevin C. Johnson (57) ABSTRACT

This invention relates to a novel application of liquid-infused surface materials (LISM) to at least a portion of one or more surfaces of razor components (e.g., frame, housing, clips, blade supports, blade body, blade edge, lubricating bodies, guard, handle, grip, button). If applied to a skin contacting surface of a component, the one or more LISM layers may generally be abrasion-resistant, long-lasting or non-erodible, desirably elevating shaving performance, such as glide, comfort, rinsing, and cleanliness, while also simplifying the manufacturing process.

15 Claims, 10 Drawing Sheets

(51) Int. Cl.
*C09D 5/16* (2006.01)
*B26B 21/60* (2006.01)
*B26B 21/40* (2006.01)
*B26B 21/14* (2006.01)
*B26B 21/52* (2006.01)
*B24B 1/00* (2006.01)

(52) U.S. Cl.
CPC .......... *B26B 21/4012* (2013.01); *B26B 21/52* (2013.01); *B26B 21/60* (2013.01); *C09D 5/00* (2013.01); *C09D 5/16* (2013.01)

(56) References Cited

U.S. PATENT DOCUMENTS

| | | | | |
|---|---|---|---|---|
| 3,911,579 A * | 10/1975 | Lane | ................ | C23C 14/56 30/346.54 |
| 5,056,227 A * | 10/1991 | Kramer | ................ | B26B 21/54 30/346.54 |
| 5,121,660 A * | 6/1992 | Kramer | ................ | B26B 21/54 451/45 |
| 5,129,289 A * | 7/1992 | Boland | ................ | B26B 21/58 30/346.54 |
| 5,142,785 A * | 9/1992 | Grewal | ................ | B26B 21/60 30/32 |
| 5,295,305 A * | 3/1994 | Hahn | ................ | B26B 21/60 30/346.53 |
| 5,669,144 A * | 9/1997 | Hahn | ................ | B26B 21/60 204/192.15 |
| 7,060,367 B2 * | 6/2006 | Yamada | ................ | B26B 21/56 30/346.53 |
| 8,926,403 B2 | 1/2015 | Mueller | | |
| 9,180,599 B2 * | 11/2015 | Papachristos | ......... | C23C 14/025 |
| 2003/0087503 A1 * | 5/2003 | Sakaguchi | ........ | H01L 21/76245 438/406 |
| 2004/0172832 A1 * | 9/2004 | Clipstone | ................ | B26B 21/60 30/50 |
| 2006/0277767 A1 * | 12/2006 | Sun | ................ | B26B 21/60 30/346.54 |
| 2007/0186424 A1 * | 8/2007 | Becker | ................ | C23C 14/028 30/294 |
| 2008/0086888 A1 * | 4/2008 | Scheinfeld | ............ | B26B 21/443 30/41 |
| 2008/0178897 A1 * | 7/2008 | Gallagher | ................ | A45D 27/46 132/200 |
| 2009/0025512 A1 * | 1/2009 | Madeira | ................ | C23C 14/345 76/104.1 |
| 2009/0188816 A1 * | 7/2009 | Purohit | ................ | A45D 27/46 206/208 |
| 2010/0011590 A1 * | 1/2010 | DePuydt | ................ | B26B 21/56 30/50 |
| 2010/0011595 A1 * | 1/2010 | Claus | ................ | B26B 21/60 30/346.54 |
| 2010/0299931 A1 * | 12/2010 | Marchev | ................ | B26B 21/56 30/48 |
| 2011/0010950 A1 * | 1/2011 | Madeira | ................ | C23C 16/042 30/346.54 |
| 2012/0229621 A1 * | 9/2012 | Turner | ................ | G01B 9/02021 348/135 |
| 2012/0321501 A1 * | 12/2012 | Chae | ................ | B22D 11/0622 420/42 |
| 2013/0014395 A1 * | 1/2013 | Patel | ................ | B26B 21/60 30/346.54 |
| 2013/0031794 A1 * | 2/2013 | Duff, Jr. | ................ | B26B 21/60 30/526 |
| 2013/0032316 A1 | 2/2013 | Dhiman et al. | | |
| 2013/0180117 A1 | 7/2013 | Hobson, Sr. et al. | | |
| 2014/0290731 A1 * | 10/2014 | Aizenberg | ............ | A61L 15/24 136/256 |
| 2015/0144522 A1 * | 5/2015 | Hibben | ................ | B08B 17/065 206/524.3 |
| 2015/0175814 A1 * | 6/2015 | Aizenberg | ............ | C03C 17/001 428/312.8 |
| 2015/0196940 A1 * | 7/2015 | Aizenberg | ............ | B05D 5/08 428/141 |
| 2016/0001456 A1 * | 1/2016 | Duff, Jr. | ................ | B05D 5/083 30/346.53 |
| 2016/0096282 A1 * | 4/2016 | Doyle | ................ | B05D 3/12 30/346.53 |
| 2017/0136640 A1 * | 5/2017 | Skrobis | ................ | B26B 21/565 |
| 2017/0136641 A1 * | 5/2017 | Siozios | ................ | C23C 14/14 |
| 2017/0348867 A1 * | 12/2017 | Papatriantafyllou | ... | B26B 21/56 |
| 2018/0001497 A1 * | 1/2018 | Fontecchio | ............ | C23C 14/24 |
| 2018/0043561 A1 * | 2/2018 | Nisby | ................ | B05D 7/50 |
| 2018/0215056 A1 * | 8/2018 | Logothetidis | ......... | C23C 14/067 |
| 2021/0031390 A1 * | 2/2021 | Skrobis | ................ | B26B 21/14 |
| 2021/0162615 A1 * | 6/2021 | Siozios | ................ | C23C 28/042 |

FOREIGN PATENT DOCUMENTS

| | | |
|---|---|---|
| GB | 1050244 | 12/1966 |
| JP | 09-253351 | 9/1997 |
| WO | WO 2009/069182 A1 | 6/2009 |

\* cited by examiner

RAZOR COMPONENTS WITH NOVEL COATING

FIELD OF THE INVENTION

The invention relates generally to razors and razor components, and more particularly, to novel coatings on these components.

BACKGROUND OF THE INVENTION

Current razors typically include a razor cartridge and a razor handle, each with components made of various substrates. As for the razor cartridge components, they typically include some of the following elements: a razor blade having a blade edge to perform the cutting of hair, a lubricating body/strip/ring, a cap, housing, a frame, a clip, a guard, a cartridge connecting structure, or any number of each or combination thereof. These cartridge components may generally be formed of hard polymeric materials, elastomeric materials and/or metals. The razor blade or blade components of the cartridge typically include a sharpened substrate, such as stainless steel, a hard coating(s) to optimize edge strength, tip shape, layered on top of the stainless steel and a soft coating(s) generally of polymeric material, such as telomer, layered on top of the hard coating (s) to impart lubricity. Many blades are generally supported in a position in the razor cartridge by blade supports. As for the razor handle, the razor handle may comprise a button, a handle grip, a cartridge connecting structure, or any combination thereof and is typically formed of some combination of elastomeric and hard plastic materials or in some instances only hard plastic or only elastomeric materials, and in some instances, inclusive of some metallic component.

The razor cartridge components have exterior or outer surfaces, many of which contact a user's skin. These skin contacting surfaces may generally play a significant role in the performance of the razor. With regard to the razor blade surfaces, it is generally known that the combination of the sharpened blade profile and the coatings (e.g., hard or lubricious) on the blade generally define the performance of the razor blade element (e.g., the cutting of hair). In addition to the blades, it is also generally known that the razor cartridge components (e.g., frame, housing, guard, cap, etc.) also have skin contacting surfaces which play a definitive role in the shaving performance of the razor. For instance, the guard generally serves to stretch the skin before the blade(s) cut the hair, and the cap, being generally positioned at the rear of the razor cartridge assists in providing glide to a user's skin after the hairs are cut.

The razor handle has multiple surfaces contacted by a user's skin as well (e.g., hands on a grip) and many razor handles have exterior surfaces comprised of anti-slip, rubber or elastomer type materials or coatings for better gripping.

Attributes such as glide, comfort, closeness, cleanliness, and appearance are generally desirable to improve or enhance shaving performance.

While lubricious coatings may generally be seen to offer some of these benefits, those that are known, for instance those which involve covalent bonding of a lubricating chemistry to the substrate (e.g., SAMP, self-assembled monolayers of phosphates) are generally highly specific chemistries and would have limited applicability across the many substrates and materials found in a razor, generally applicable to only a narrow material range. Additionally, these coatings and others, tend not to be resistant to abrasion resulting in the coating wearing off with use leading to a reduction in functionality.

Thus, it would be desirable to further optimize one or more of a razor component's many types of surfaces and/or razor production steps, while maintaining or improving a razor's overall performance. This may include but is not limited to, optimizing the cartridge glide over the skin, optimizing the blade itself, and/or ensuring that the razor handle stays clean, free from deposits and bacterial growth.

SUMMARY OF THE INVENTION

In accordance with the invention, a razor apparatus includes a substrate having a skin contacting surface, the skin contacting surface having at least one portion of a porous, liquid-infused structured surface material disposed thereon.

In the present invention, a razor apparatus comprises at least one portion of at least one surface of a razor component having at least one layer of LISM material disposed thereon. The razor component comprises one or more of the following: a razor blade, each blade having a blade edge and a blade body, a blade support, a housing, a frame, a guard, a cap, a lubricating strip, a lubricating ring, a clip, a cartridge connecting structure or any combination thereof, a handle, wherein the handle further comprises a button, a handle grip, or any combination thereof.

The surface portion of a razor component comprises an outer skin contacting surface, an inner surface, a sharpened substrate, or any combination thereof and the at least one surface is comprised of a polymeric material, an elastomeric material, a hard plastic material, a metal, an aluminum, a glass, a ceramic, or any number or combination of materials thereof.

In one aspect of the invention, the at least one layer of LISM layer is directly disposed on the at least one portion of the at least one razor component surface.

In another aspect of the invention, the at least one razor component is a hard plastic frame and the at least one LISM layer is disposed on an outer surface of the frame. In yet another aspect, the razor component is a blade body with at least one LISM layer disposed directly on the blade body substrate, on one or more interlayers disposed between the LISM layer and the substrate, in between one or more outer layers and the substrate, or any combination thereof. In still another aspect, an outer surface of a blade support comprises at least one LISM layer disposed thereon. Further still, an outer surface of a guard comprises at least one LISM layer disposed thereon.

In yet another aspect of the present invention, the at least one LISM layer comprises a pattern or graphic.

In a further aspect, the at least one LISM layer is disposed on the at least one surface of the at least one razor component via infiltration of a fluid into a solid structure by dipping, spraying, brushing, molding, sintering, printing, etching, application via pad or paint, ink-jet nozzle, masking, or any combination thereof.

In another aspect, the at least one LISM layer is substantially non-erodible. The coefficient of friction for the at least one razor component having said LISM layer is about 50% less than that of an identical razor component without the LISM layer.

In another aspect, the LISM layer provides antimicrobial properties.

In yet another aspect, all skin contacting surfaces of said cartridge unit include at least one LISM layer. Further, each of the at least one LISM layers provides a different coefficient of friction for the at least one razor component surface.

In yet another embodiment of the present invention, a razor comprises at least one substrate wherein the at least one substrate comprises a LISM layer.

In another embodiment, a method of making a razor component comprises providing a substrate and depositing at least one layer of LISM layer on at least a portion of a surface of said substrate wherein the depositing step comprises infiltration of a fluid into a solid structure, dipping, spraying, brushing, molding, sintering, printing, etching, application via pad or paint, ink-jet nozzle, masking, or any combination thereof. The at least one LISM layer is substantially non-erodible or wear-resistant.

In an alternate embodiment of the present invention, a shaver apparatus includes a component having at least one layer of LISM material disposed thereon. The component may be a non-cutting element or a cutting element. The non-cutting elements contemplated by the present invention include a cartridge or handle component, such as a clip in a wet shaver or an outer or inner surface of a foil disposed in an electric dry shaver. The cutting element could be a cutter element in an electric dry shaver or a razor blade edge in a wet shaver.

A method of making a razor component includes providing a porous solid on at least one surface of at least one substrate of a razor component and impregnating at least one liquid into the porous solid, thereby forming at least one LISM layer. The impregnating step may include infiltration or impregnation of a fluid/liquid into a solid structure by dipping, spraying, brushing, molding, sintering, printing, etching, application via pad or paint, ink-jet nozzle, masking, or any combination thereof. The method further includes a step of activating the porous solid prior to the step of impregnating. The at least one LISM layer formed is substantially non-erodible.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

BRIEF DESCRIPTION OF THE DRAWINGS

While the specification concludes with claims particularly pointing out and distinctly claiming the subject matter which is regarded as forming the present invention, it is believed that the invention will be better understood from the following description which is taken in conjunction with the accompanying drawings in which like designations are used to designate substantially identical elements, and in which:

DETAILED DESCRIPTION OF THE INVENTION

This invention relates to a novel application of a liquid-infused surface layer or a liquid-infused based material to surfaces of razor components, where the razor components may be non-cutting or cutting components.

The resultant novel razor component surface may or may not be a hybrid type of surface, having porous and solid characteristics. The resultant novel razor component surface may be smooth, and to some extent, slippery and/or wet. The resultant novel surface may be a microscopic coating on surfaces of razor components.

The low friction properties of the novel surface material applied on the razor components (such as the razor frame or cap and/or blade bodies or edges), may provide significant benefits, as the surface coating may elevate blade performance attributes such as comfort and glide.

It is further contemplated in the present invention that a razor component may in and of itself be fully or partially comprised of the novel liquid-infused surface material via the application of multiple layers, one on top of each other, or formed with only liquid-infused surface material. This may potentially simplify the manufacturing process of these razor components by eliminating process steps or materials.

Liquid-infused surfaces of the present invention may be applied to almost any type of razor component material, inclusive but not limited to, polymers, metals, ceramics, or glasses.

A known such liquid-infused surface is described in the Sep. 22, 2011 issue of the journal *Nature,* therein dubbed SLIPS (for slippery-liquid-infused porous surface) for its ability to repel water and oil-based liquids while also preventing bacteria from forming on surfaces, all beneficial attributes for surfaces or structures of razor components.

SLIPS material is generally known to be comprised of a solid structure and a liquid structure. For instance, it may be comprised of a functionalized porous textured solid structure such as a nano/microstructured substrate infiltrated or impregnated with a low-surface-energy, chemically inert liquid to form a physically smooth and chemically homogeneous lubricating film on the surface of the substrate. The lubricating fluid is thereby infused and generally locked within the more solid structure. The lubricating fluid may or may not entirely remain in the structure as some amount of fluid may seep or leach out (e.g., during shaving use). Since liquid films are generally smooth, self-healing and pressure-resistant, the choice of liquid film may be optimized for shaving conditions. The lubricating fluids chosen for a razor component of the present invention may be perfluorinated fluids such as DuPont Krytox 100 and 103 and 3M Fluorinert™ Liquids. The solid structure may be a random structure of Teflon nanofibrous membranes and/or whiskers or an ordered structure (e.g., periodically ordered epoxy-resin-based nanostructured surfaces). The terms "fluid" and "liquid" may be used interchangeably herein.

The terms "liquid-infused surface (LIS)" or "liquid-infused surface material (LISM)" or "slippery-liquid-infused porous surface (SLIPS) or "SLIPS layer" or "liquid-infused surface layer" or "SLIPS-based" or "SLIPS-like" or "LIS-like" or "LISM-like" may generally be used interchangeably herein and generally signify the base material itself or any derivative of the material, such as a chemical or optically etched surface. The term LISM without additive components may sometimes be called the base or baseline material to distinguish it from a LISM material containing second phase or solid solution additives or other elements. The additives may generally include, though would not be limited to, components such as silicones, botanical and natural oils, and polyethylene oxide.

While some liquid-infused surfaces are synthetic or chemically based, other types of liquid-infused surfaces with similar functionality are known which are generally plant-based, both types contemplated for use in the present invention.

While also providing lubricity, the LISM material applied to razor components may assist in preventing bacteria from growing on razor component surfaces thereby providing a consumer benefit protection to the skin by not transmitting and/or infecting the skin with bacteria generally found on razor components particularly after many uses. Razor handles are often used for many years in warm wet environments, and cartridges contain blood and skin and hair fragments creating a breeding ground for a host of bacteria which may also be found in the organizer trays and the cartridge dispensers. Additionally, the LISM material may assist in preventing calcium carbonate deposits.

LISM coatings applied to razor components such as the housing or frame may theoretically outperform current razor cartridges without such a coating by providing enhanced glide and wear resistance. LISM coatings may also be applied to the skin management areas such as the guard or cap area which may result in further optimized cartridge performance such as stretch or glide during shaving. Razor components comprising LISM may exhibit unexpected improvements over current razor components or materials in that the LISM coating, if disposed on an exterior surface of a razor component, may be longer-lasting, substantially immune to abrasion, eroding, and wear, and thereby provide a close comfortable shave for a longer period of time for a user.

These LISM coatings generally have the unique advantage in that they adhere to a wide range of materials including a wide range of polymers, elastomers and metals. This allows the application of LISM material to fully assembled product in a single step and may generally provide, for example, low friction coatings on multi-component and multi-material razors.

The process for applying a synthetic type LISM coating to an exterior surface of a razor component may generally include, but is not limited to, infiltrating a porous solid with low-surface energy, chemically inert liquid to form a physically smooth and lubricating film on the surface of the substrate. The film may generally be spread and formed onto the whole substrate through capillary wicking where the thickness of the film can be controlled by the fluid volume introduced since the surface area to be coated is generally known. The notion of the solid to liquid interaction may be considered as a lock and key composition in that the composition of the LISM is carefully matched.

While an exterior surface comprised of polymer may be the desired substrate of the present invention (upon which the LISM material may be applied), as it is the common substrate for razor cartridge components such as the housing or the frame, the use of LISM on razor blade substrates, whether comprised of stainless steel, other metals, ceramic, composite, plastic, glass, or any combination thereof, are also fully contemplated in the present invention. The apparatus for processing razor blades with the LISM material may desirably include processes which are used today, in particular, the spraying and sintering commonly used for depositing a poly-tetrafluoroethylene (PTFE) layer.

In the present invention, many non-cutting razor components such as the housing or the guard are formed by molding techniques, such as injection molding or two-color injection molding.

Figure 1:
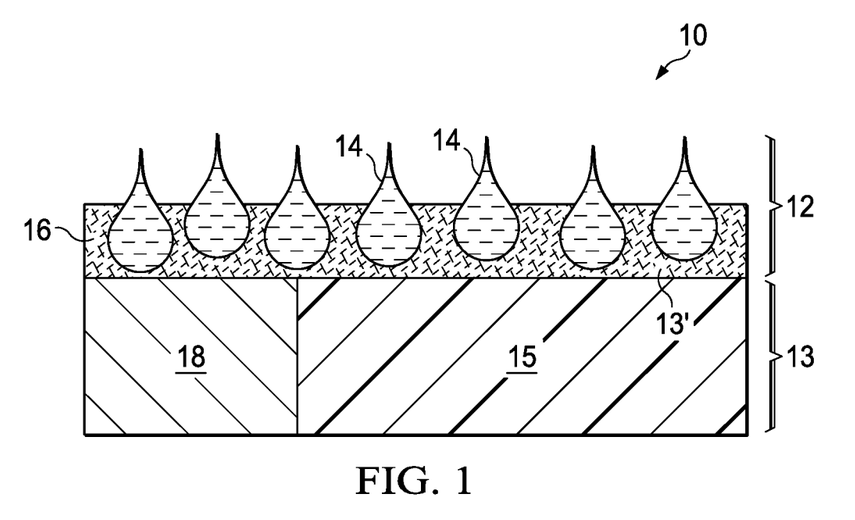
FIGS. 1 and 1a are diagrammatical views of two different formations of LISM on component substrates in accordance with the present invention.

Turning now to FIG. 1 of the present invention, depicted is a portion of a razor component 10 comprising at least one layer of LISM 12. The LISM layer 12 may desirably be formed by impregnating a porous solid matrix 16 deposited on a surface 13' of a substrate 13 with a compatible liquid 14. The substrate may include two different materials; as shown in FIG. 1, both a metal 18 and a polymer 15 are part of the component substrate 13 upon which the LISM layer is disposed.

Figure 1A:
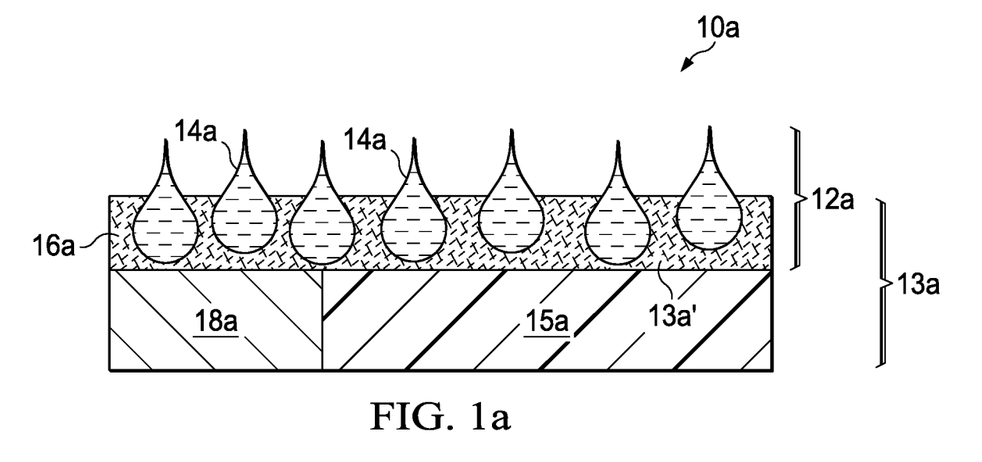

In another embodiment of the present invention shown in FIG. 1a, a razor component portion 10a includes initially and appropriately modifying one or more surface(s) 13a' of a substrate 13a yielding a porous modified surface 16a and forming the layer of LISM 12a thereon by impregnating a liquid 14a into the porous modified surface 16a. Here, as in FIG. 1, the substrate 13a of the component 10a may comprise both a metal 18a and a polymer 15a.

In an alternate embodiment of either FIG. 1 or 1a, before the step of impregnating a liquid into the solid, the porous solid 16 or 16a may be activated. The activation may be achieved chemically, thermally, optically or in any other feasible manner. In some instances, the activated porous solid 16 or 16a may generally provide an improved absorption or adhesion of the liquid into the porous solid.

It is also contemplated that the nature or type of liquid that is impregnated into the porous solid may be different in one embodiment versus that of any of the other embodiments described herein and that one type of liquid may offer increased benefits (e.g., such as better wear, less erodibility) over another type of liquid were it found in the same structure.

The formation of the at least one layer of LISM in the present invention may also generally be comprised of one or more of the methods of making and devices disclosed in US Patent Publication No. 2013/0032316, entitled *LIQUID-IMPREGNATED SURFACES, METHODS OF MAKING, AND DEVICES INCORPORATING THE SAME*, published Feb. 7, 2013 and/or US Patent Publication No. 2013/0032646, entitled *ARTICLES FOR MANIPULATING IMPINGING LIQUIDS AND METHODS OF MANUFACTURING SAME,* published on Feb. 7, 2013, incorporated herein by reference. As described in the prior art, compared to gas-impregnated surfaces, liquid impregnated surfaces provide several advantages. One such advantage is that liquid-impregnated surfaces have a much higher resistance to impalement, allowing a LISM to withstand higher pressures (e.g., higher pressure velocities) during impingement. In certain embodiments, a liquid-impregnated surface resists impalement through the use of micro-scale surface textures, rather than nano-scale textures which are utilized in gas-impregnated surface approaches. Moreover, micro-scale textures are less expensive and easier to fabricate than nano-scale textures.

Through proper selection of impregnating liquid, the LISM layers described herein are easily customizable to suit a wide variety of applications. For instance, water drag reduction on a solid surface may be achieved by using oil as the impregnating liquid as water slips readily on oils. The use of oils is also suitable for preventing frost and ice formation (e.g., frost and ice may form on peaks of surface textures, thereby greatly reducing ice formation rates and adhesion strengths). Having a surface with a matrix of features spaced sufficiently close to stably contain a liquid therebetween or therewith is an important aspect of LISM layers. The liquid at room temperature generally has a viscosity no greater than about 1000 cP (or cSt), no greater than about 100 cP (or cSt), or no greater than about 50 cP (or cSt). The liquid's vapor pressure at room temperature is generally no greater than about 20 mm Hg, no greater than about 1 mm Hg, or no greater than about 0.1 mm Hg. The LISM layer features may generally have substantially uniform height and the liquid fills the spaces between the features and coats the feature with a layer at least about 5 nm in thickness over the top of the features. The feature to feature spacing may range from about 1 micrometer to about 100 micrometers or from about 5 nanometers to about 1 micrometer. The LISM layer may comprise hierarchical feature structures of micro-scale, nano-scale, or a combination thereof, such as micro-scale features with nano-scale features disposed thereon.

Figure 2:
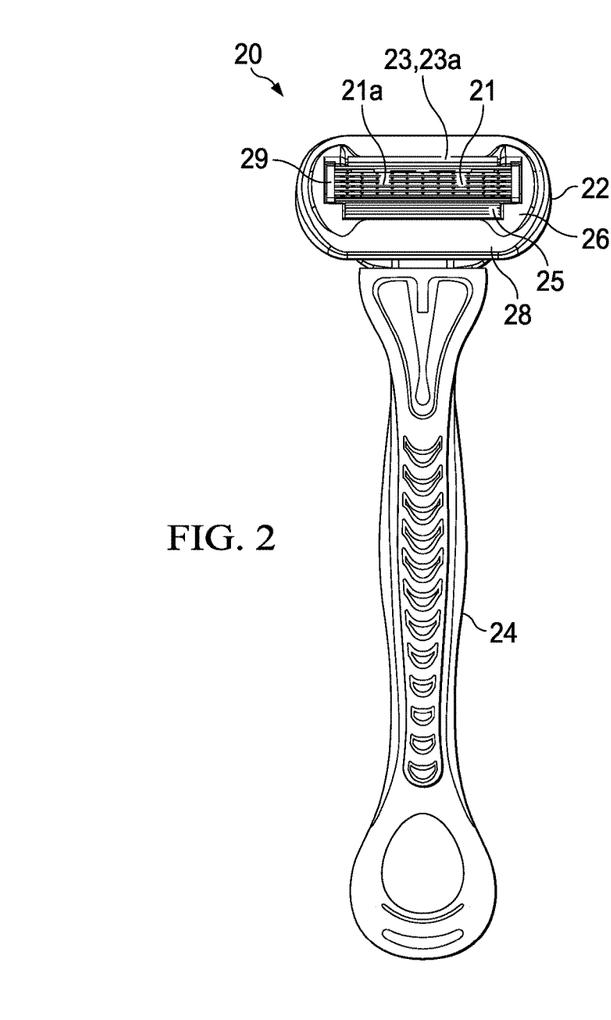
FIG. 2 is a front view of a wet razor having a cartridge unit and a handle with LISM disposed on at least one razor component in accordance with the present invention.

Turning now to FIG. 2, a front view of a wet razor 20 generally includes a shaving or cartridge unit 22 attached to a handle 24 with the shaving unit 22 having one or more blades 21 (e.g., 5 blades shown) each with a sharpened edge 21a in accordance with the present invention. A cap 23 and guard 25 may also be included in the shaving unit 22, the cap 23 preferably including a lubricating strip or shaving aid composite 23a affixed thereon. The lubricating strip or shaving aid composite 23a may generally be comprised of water soluble and water insoluble polymers. The shaving unit 22 also includes a frame or housing 26, preferably made of hard plastic. In this particular shaving unit 22, there is also present a lubricating ring 28 disposed around the periphery of the shaving unit 22. The lubricating ring 28 may generally be comprised of water soluble and water insoluble polymers. The cartridge unit 22 may be adapted for coupling and uncoupling from the razor handle 24 such that a new cartridge unit 22 may be coupled to the handle when the blades become dull or may be integral with a handle 24 so that the complete razor 10 is discarded when the blades become dull.

Figure 2A:
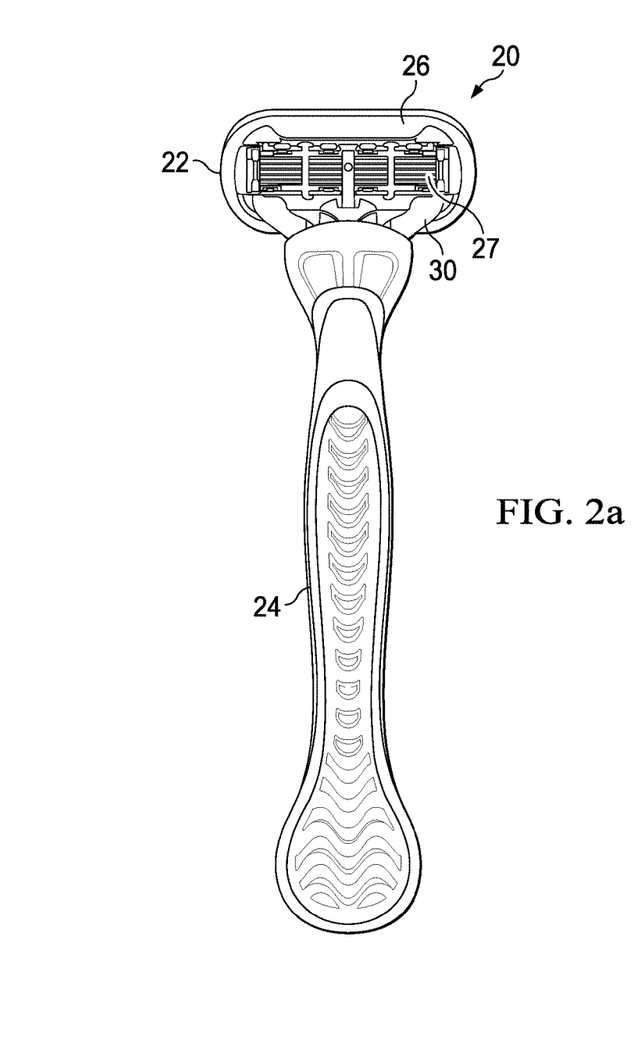
FIG. 2a is a rear view of a wet razor having a cartridge unit and a handle with LISM disposed on at least one razor component in accordance with the present invention.

FIG. 2 depicts the opposite or rear side of the razor 20 showing the back side of the frame 26 along with a blade support unit 27 which preferably may be a metal or plastic unit used to support the individual blades. The blade support 27 may preferably be disposed within an aperture of the frame 26 after the blades 21 are inserted therein and held in by a pair of clips 29 on either end of the support 27. Also shown in FIG. 2 is a cartridge connecting structure 30 which is a structure that connects the cartridge unit 22 to the handle 24. The structure 30 may be part of the handle 24 or may be part of the cartridge unit 22.

While a specific embodiment of a razor is depicted in FIGS. 2 and 2a, any razor construction type is contemplated in the present invention.

It is noted that one or more of the portions of the surfaces of the razor components of the razor 20 shown in FIGS. 2 and 2a has at least one layer of LISM material disposed thereon in accordance with the present invention. In a preferred embodiment, the LISM material may at least be disposed on all or portions of the frame 26, though any of the above-mentioned and shown components may have a LISM material disposed thereon, as will be described in more detail below.

The frame 26 may generally be comprised of hard plastic, such as Noryl or poly-propylene. Similar hard plastic may generally be utilized for other razor components, such as the blade support 27, portions of the handle 24 or cartridge connecting structure 30.

Figure 3:
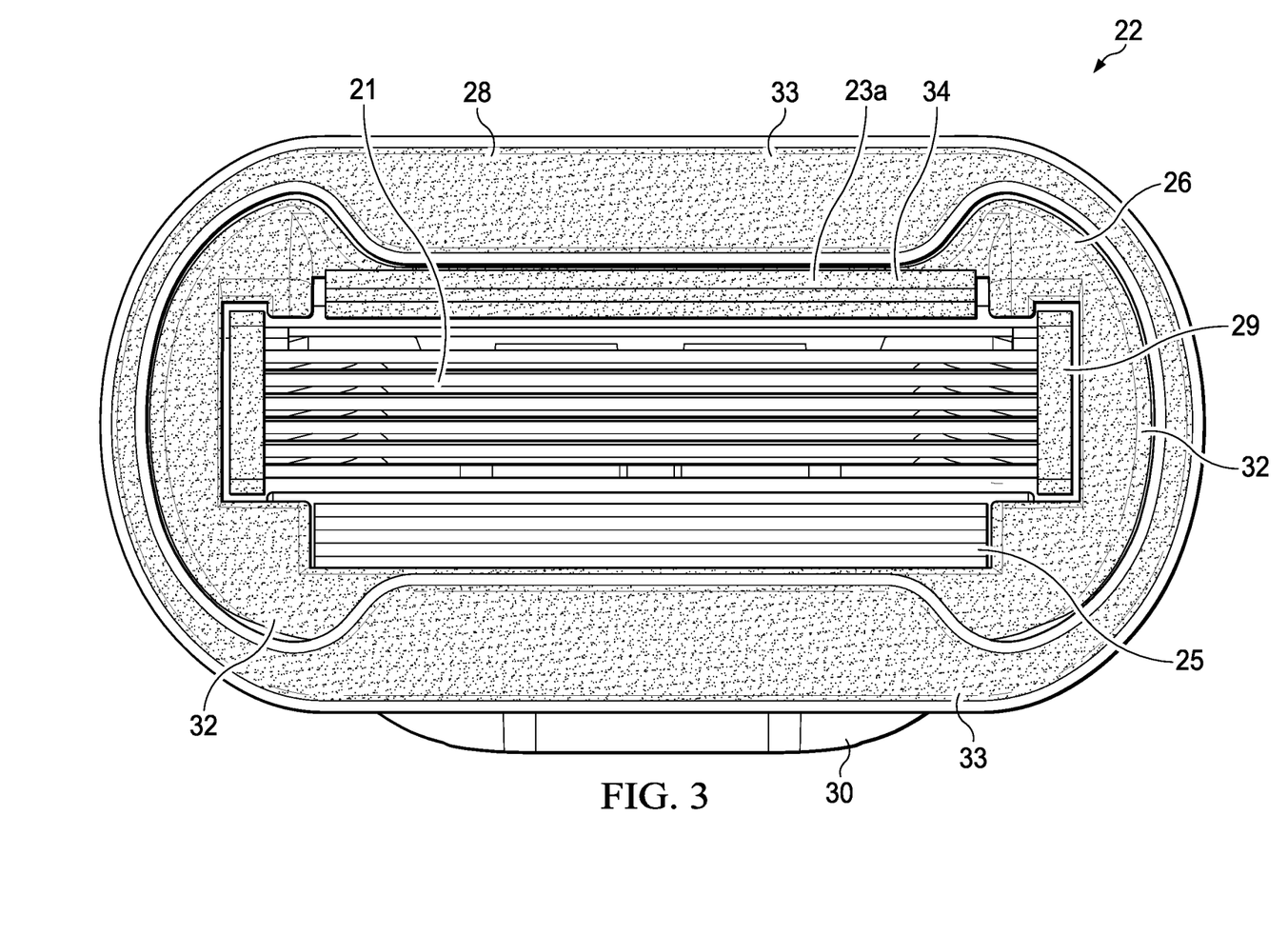
FIG. 3 is a diagrammatical view of the cartridge unit of FIG. 1 in accordance with the present invention.
Figure 4:
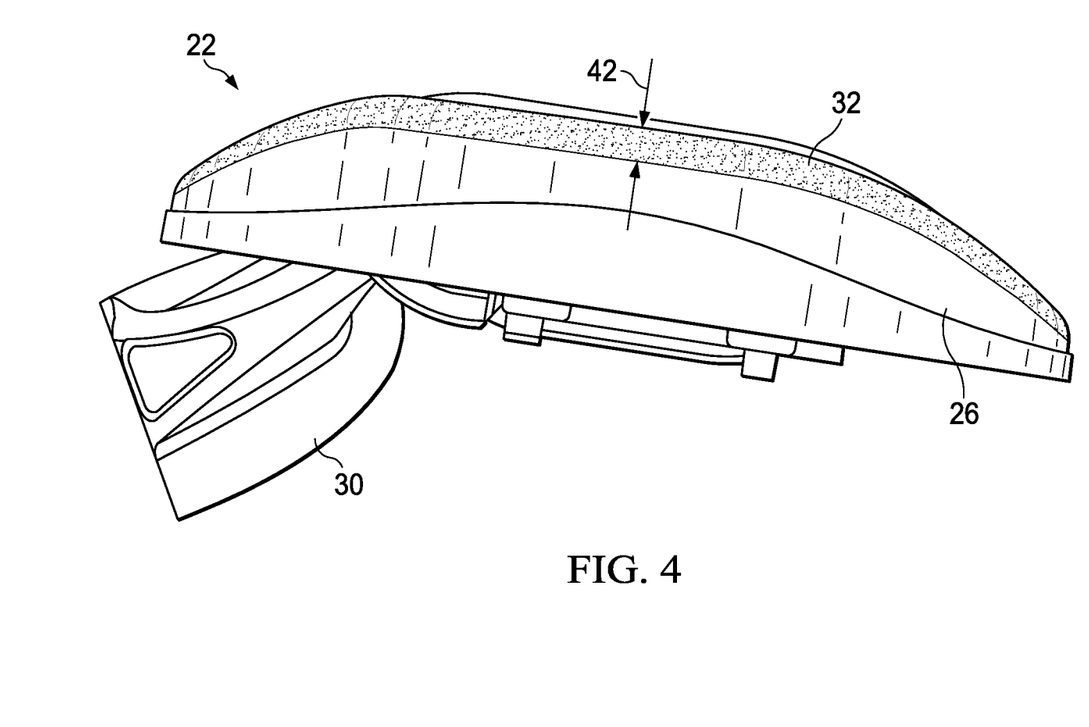
FIG. 4 is a side view of the cartridge unit of FIG. 3 with LISM disposed on the frame in accordance with the present invention.

Turning now to FIG. 3 of the present invention, a close-up view of a shaving unit 22 of FIG. 2, is shown. Here, frame 26 is coated with a LISM material 32, as also depicted in FIG. 4, which shows a side view of unit 22 of FIG. 3. The coating of the LISM material may have a thickness 42 as shown in FIG. 4 ranging from about 10 nm to about 1 micron.

Lubricating ring 28 and lubricating strip 23a, both comprising polymers as mentioned above, may also have a LISM material 33 and 34, respectively, disposed thereon. The thickness of the LISM material 33, 34 on these components may vary from, or be similar to, the thickness of a LISM coating on the other razor components. Alternatively, the LISM coatings may be applied to only certain portions of each of the components. For instance, the guard may only be partially coated with LISM in an effort to achieve a desirable combination of glide and drag. If the housing for instance is a component that is LISM-coated, the housing friction may generally be reduced by 50% or more than a non-LISM coated housing thereby providing an improvement in cartridge glide during shaving.

As can be seen, any, e.g., one, two, three, or all components of a razor cartridge may be coated with LISM material. In this way, the cartridge friction can be selected on a component by component basis. The selective level of friction or the ability to modulate the friction component by component may be achievable in the present invention and beneficial in that components can be adapted to each other's friction level or adapted to different user requirements, surpassing shaving attributes of current razors.

Figure 8:
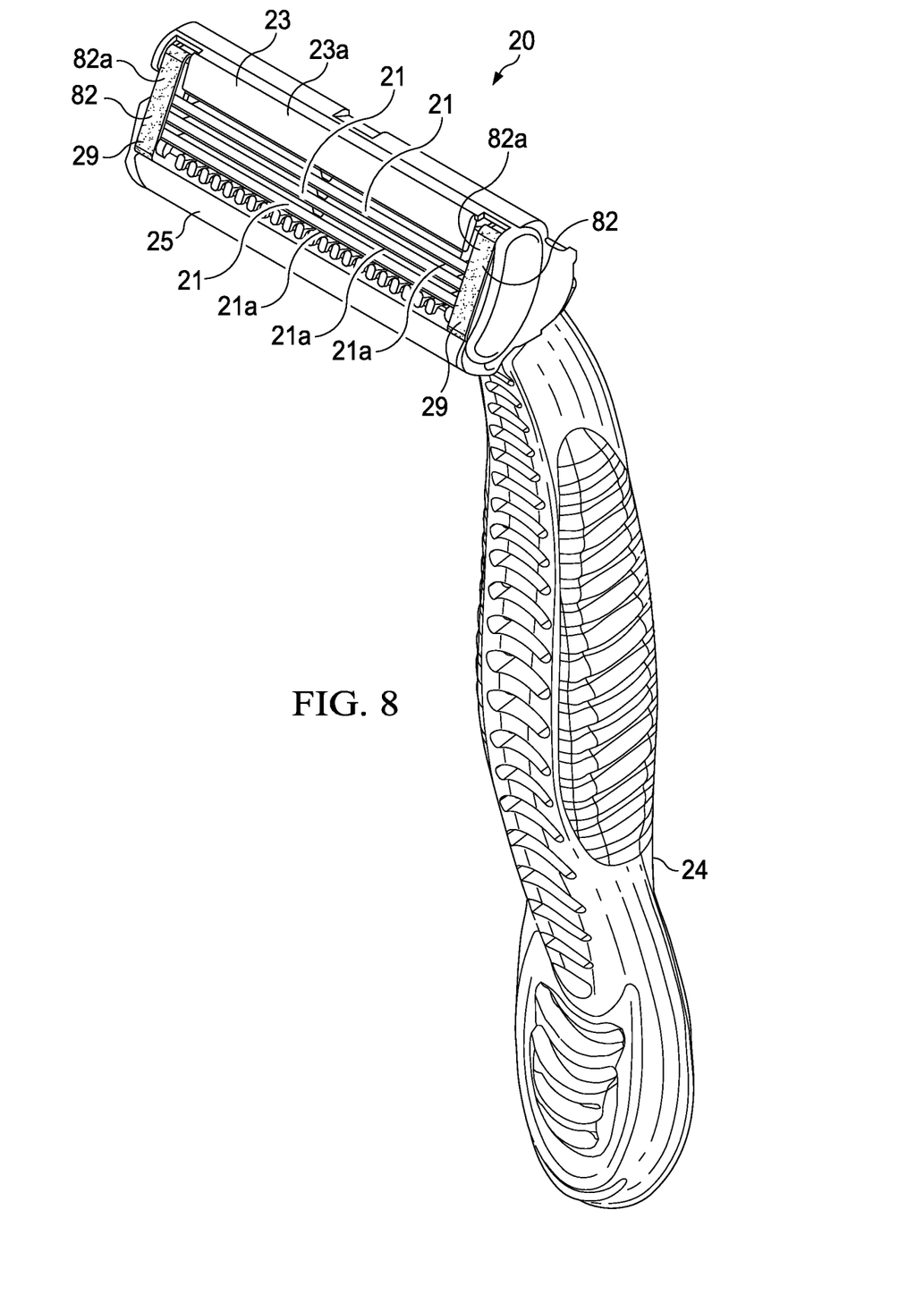
FIG. 8 is a perspective view of clip components having LISM disposed thereon in accordance with the present invention.
Figure 9:
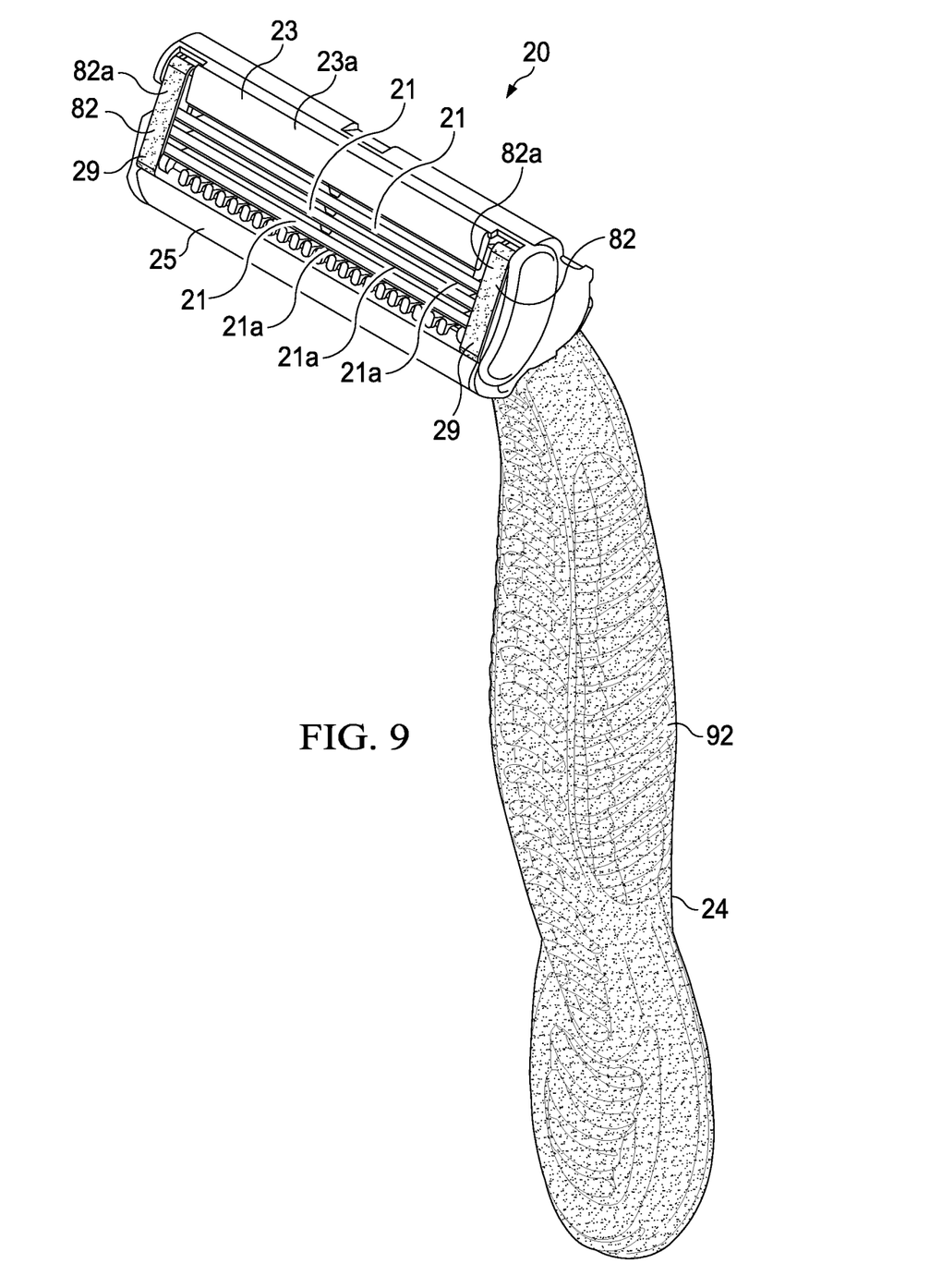
FIG. 9 is a perspective view of handle component having LISM disposed thereon in accordance with the present invention.
Figure 10:
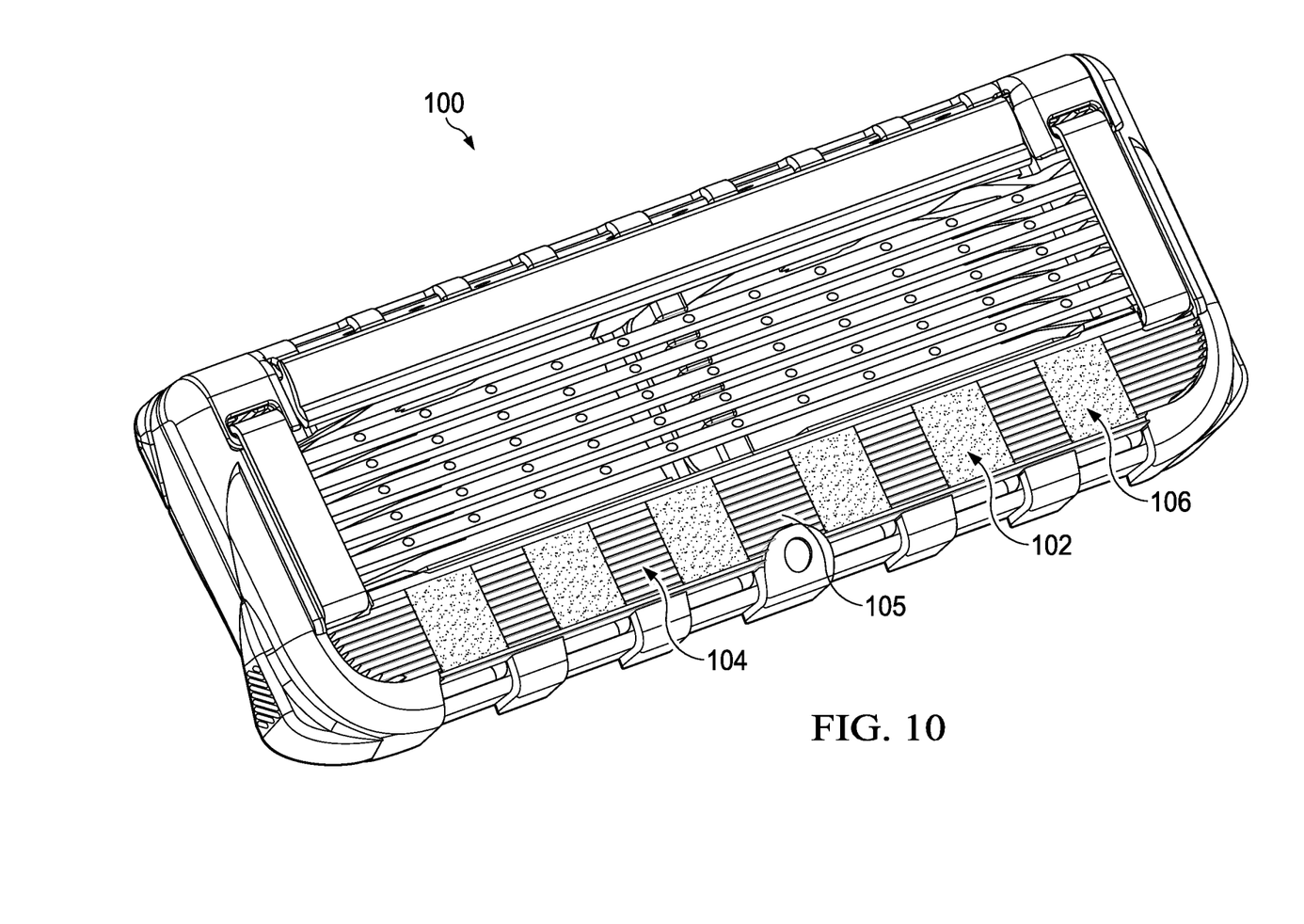
FIG. 10 is a close-up view of a razor cartridge having LISM disposed in a pattern on a guard component in accordance with the present invention.

A high coefficient of friction (COF) may be required where control or grip is required, for example under wet conditions. Components where control or grip is required under wet conditions may include razor handles and guard components, for instance as shown in FIGS. 9 and 10. A lower coefficient of friction may generally be required where high glide or slipperiness is desired. Components where high glide is generally required may be the housing or cap area, the lubricating body or the clips for instance as shown in FIGS. 4 and 8. By providing the proper level of friction and it being substantially non-erodible, abrasion-resistant, or long-lasting and hydrophobic, the LISM layer provides many benefits to the razor cartridge.

As mentioned above, razor blades perform the cutting function of a razor cartridge. The term "razor blade" in the present invention desirably signifies a "substrate" comprised of stainless steel which includes a blade body and at least one flank. A "substrate" signifies the substance or material acted upon in the present invention. Desirably, a razor blade includes two flanks forming a blade edge and a blade body. The two flanks intersect at a point or tip, or what is oftentimes referred to as the ultimate tip. Each flank may have one, two or more bevels. The blade body is generally the remaining area of the razor blade beneath the flanks or bevels.

Figure 5:
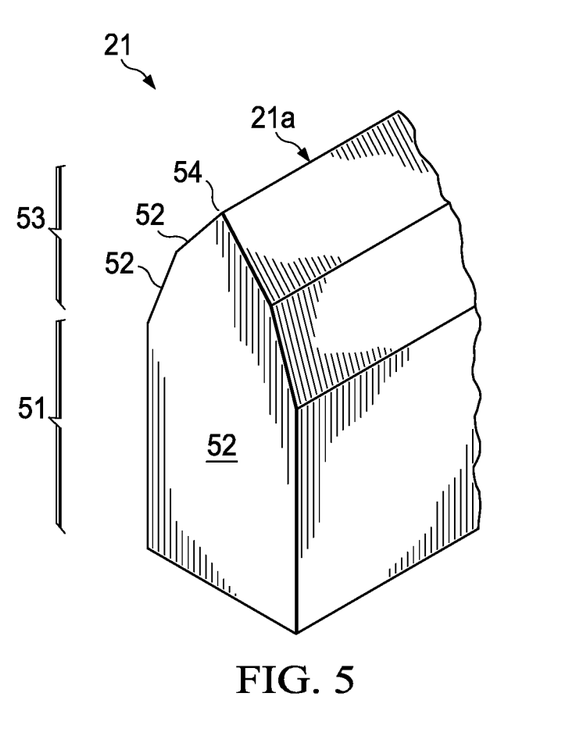
FIG. 5 is a close-up view of elements of a blade edge of the present invention.

A stainless steel substrate 52 typically has a sharpened edge formed in a sequence of honing operations that form a tip portion 54 with a radius typically less than 500 angstroms and edge flanks 53 which may or may not include one or more bevels 52 as shown in FIG. 5. As shown in FIG. 5, the blade 21 of FIG. 2 generally includes a blade body 51, two bevels 52 for each of two flanks 53 which intersect at tip 54 forming a blade edge 21a.

Figure 6:
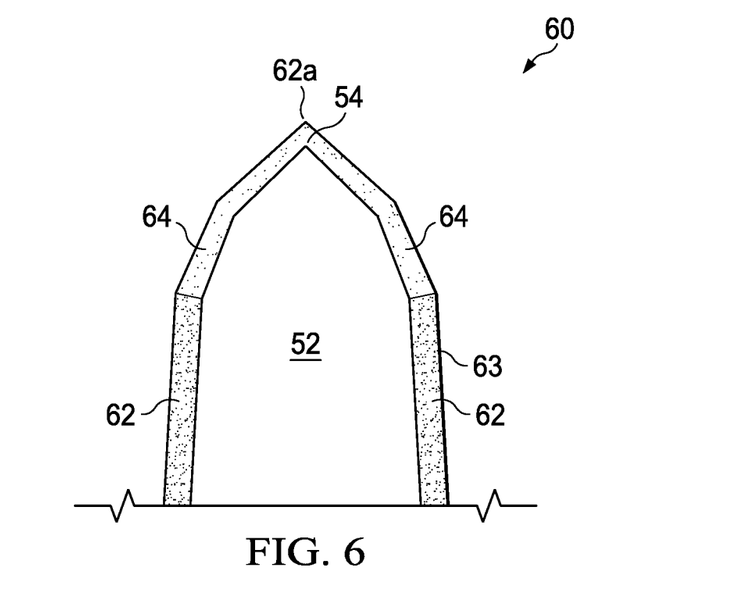
FIG. 6 is a close-up view of the blade of FIG. 5 having LISM disposed on a portion thereon.

A diagrammatic view of a blade region 60 or sharpened substrate, and in particular the blade body region 51 and blade edge 21a of blade edge 21 of FIG. 5, is shown in FIG. 6 of the present invention.

Figure 6A:
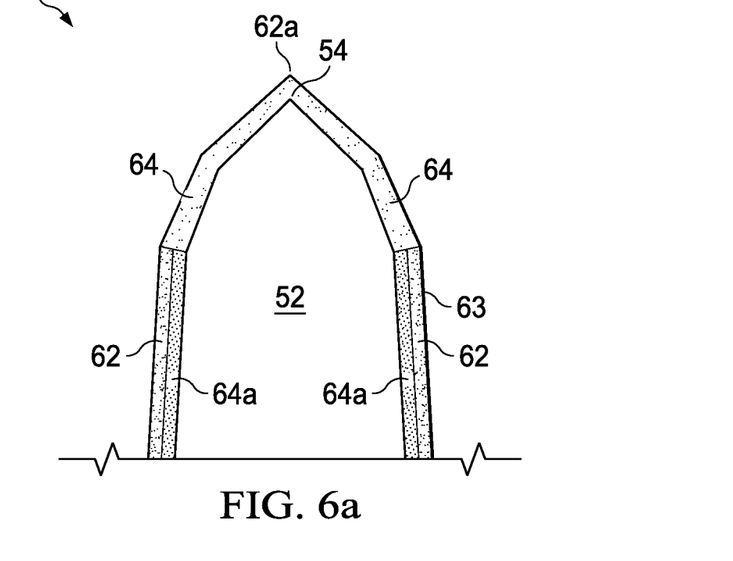
FIG. 6a and 6b are close-up views of alternate embodiments having LISM disposed on a blade of the present invention.
Figure 6B:
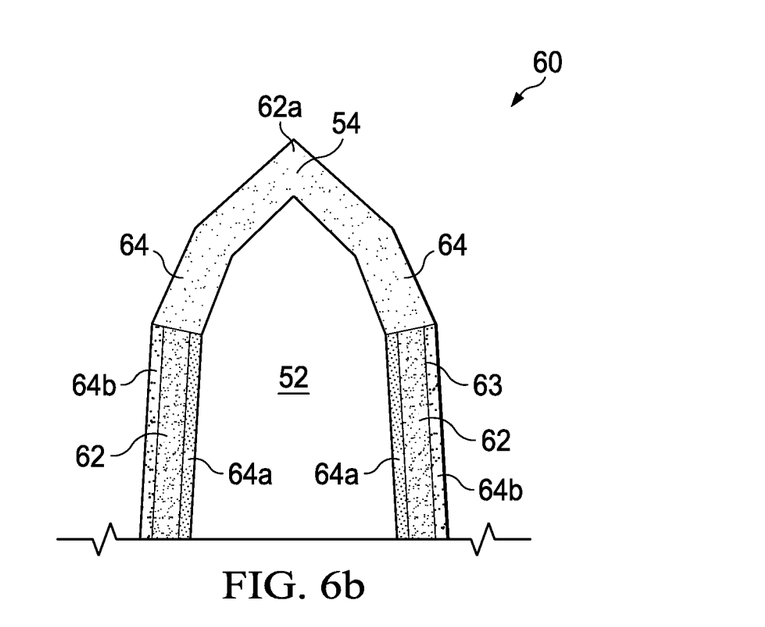

Deposited on the body 51 of substrate 52 is at least one layer of LISM material 62 in accordance with a preferred embodiment of the present invention. The LISM material 62 may be deposited directly onto the substrate as shown in FIG. 6 or may be deposited on top of one or more other layers 64a shown in FIG. 6a, already deposited on the substrate 52, such as one or more interlayers, one or more adhesion layers 64a as shown in FIG. 6b to assist in adherence of the LISM coating 62 to the substrate 52, and/or one or more overcoat layers 64b as shown in FIG. 6b. Though any portion of the blade, such as the blade edge, may be coated with LISM material in the present invention the tip 54 and flanks 53 may desirably not comprise a LISM material layer deposited thereon, but rather have other hard and/or soft coating(s) 64 as shown in FIGS. 6, 6a, 6b that can be or are more commonly used as coating(s) in the blade edge area.

For instance, if LISM coatings are applied on a razor blade edge substrate as an overcoat layer in addition to or as substitute to PTFE, in many instances the outermost lubricious coating of many razor blades (not shown), the presence of a LISM layer may theoretically exhibit unexpected improvements over known telomers in that the LISM layer may be longer-lasting, substantially immune to abrasion, eroding, and wear, and thereby provide a close comfortable shave for a longer period of time for a user. For instance, with the substantially non-erodible LISM layer present, instead of having to replace the razor cartridge or razor every 14 shaves, a user may only have to replace the razor every 20 or more shaves, an enormous consumer benefit. However, a disadvantage of such a coating in this area may be an increased tip radius or altered blade edge shape which in turn may not provide a close and/or comfortable shave.

The thickness of the LISM material 62 may desirably range from about 10 nm to about 1 micron and may or may not be uniformly deposited throughout the tip and flanks. It should be noted that the LISM material may be deposited despite any variation in lengths of flanks, angles, and aspect ratios (e.g., the ratio of the distance from the blade tip portion to the LISM tip 62a and the width of LISM material coating 62 at the tip portion 54).

The LISM coating 62 may extend down the entire length of the blade body 51 or may stop or taper off at a lower point of the blade body.

As noted above, the apparatus for processing of this type may desirably include spraying, brushing (e.g., air brushing), dipping, sintering, molding, printing, or application via pad or paint, ink-jet nozzle, etching, or any masking to allow for selective placement of coating while other feasible methods known in the art are also contemplated as applicable processing techniques for LISM in the present invention.

Due to the innate nature of the LISM layer 62 being slippery, non-sticky or non-adhesive, the outer surface 63 of the LISM layer 62 inherently provides glide to the blade body which may assist in rinsability and the removal of cut hairs and other debris. In addition, anti-microbial properties of the LISM coating 62 may ostensibly act as a barrier to the growth of bacteria, fungus, and other organisms on the razor blade bodies which in turn may provide a clean overall blade to a user's skin.

A further advantage found with a LISM layer or coating applied to the surface of any portion of the blade or its support or any of the other razor components herein may be its ability to diminish corrosion or other decay of the blade, blade support, welds, or of the other coatings on the blade.

Figure 7:
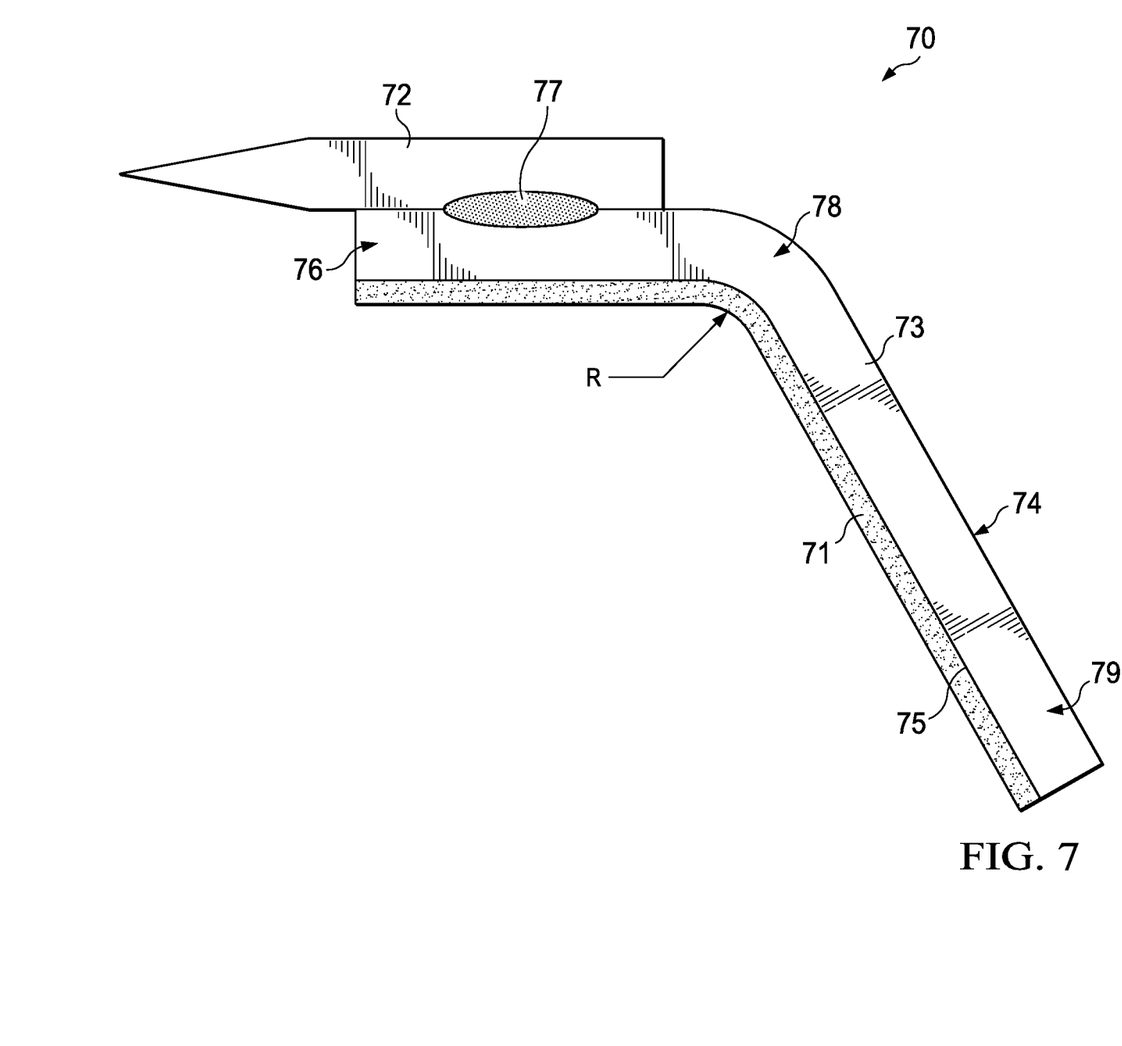
FIG. 7 is a close-up view of a blade support having LISM disposed thereon in accordance with the present invention.

In FIG. 7, in accordance with the present invention, a supported blade 70 is shown which includes a blade 72 and a blade support 74. The blade support 74 is intended to support the blade 72, the latter similar to blade 21 of FIG. 5. Blade 72 is generally welded to an upper portion 76 of the blade support. The blade support 74 also includes a bent portion 78, generally having a radius of curvature R of about 0.05 mm to about 0.15 mm, and a lower portion 79. In some implementations, the blade support may have a thickness of from about 0.0 mm to about 0.40 mm, e.g., about 0.15 mm to about 0.30 mm.

Generally, the blade 72, as discussed above, is formed of steel, e.g., stainless steel. The blade support may be formed of any desired metal, but is generally formed of steel also, e.g., carbon steel or stainless steel. The blade support of the present invention includes a LISM coating 71 on the lower outer surface 75 of the blade support. Lower outer surface 75 is generally not a skin contacting surface and may be thought of as an inner surface of the razor cartridge. Generally, the coating 71 may cover the entire lower surface of the blade support as shown. As contemplated in the present invention, the entire blade support 74 may also be coated with LISM coating 71 in that upper surface 73 of the blade support may also be coated (not shown) in addition to or in lieu of the coating on the lower outer surface 75, however, surface 73 may be desirably left uncoated as shown as a coating in this area tends to interfere with formation of the weld 77 (if conventional welding techniques are used) and may also undesirably increase cost.

The LISM coating 71 may have any desired thickness anywhere on the blade support. However, a thin coating, e.g., less than 5 μm and preferably about 2 to 3 μm, maintains the tolerance of the design and is relatively inexpensive to produce. The coating should be sufficiently thick to last for the intended life of the shaving system, for example at least about 14 shaves. In some implementations it is preferred that the coating be at least 1 μm thick.

The LISM coating 71 may be applied by any process that will provide adequate adhesion of the coating to the underlying steel. If the coating is formed on flat sheet metal, e.g., prior to bending the blade support to the desired shape, the adhesion must be sufficient to allow the metal to be formed (e.g., by stamping) without de-lamination of the coating. Suitable coating methods may desirably include spraying, brushing, dipping, sintering, printing, or application via pad or paint, ink-jet nozzle, or any masking to allow for selective placement of coating while other feasible methods are also contemplated. The coating is preferably uniformly applied and may be formed of a material comprising substantially LSIM or may be a composite of LISM and one or more other materials.

The LISM coating 71, as disposed in FIG. 7, as mentioned above is generally not disposed on a skin-contacting surface; however, it may generally serve to reduce clogging of hair, shave preparation, and other debris that remains in the spans between the blades of a razor cartridge even after rinsing. This may become gradually more important as the spans in many razor cartridges are increasingly reduced. While in some razor cartridges supported blades are not utilized, but rather bent blades (e.g., those blades that do not have a need for a blade support because they are comprised of a one-piece "bent" metal component), the concept of applying a LISM coating such as coating 71 to the bottom outer portion blade, as described above, would however be equally applicable to a bent blade embodiment.

The present invention further contemplates the LISM material in addition to being deposited on blade edges, being deposited on any other razor components, such as those components designated in FIGS. 2, 2a. The coatings of LISM material, if applied to other razor cartridge components, may theoretically improve wear resistance of those parts and/or glide during shaving, particularly if disposed on clips or other hair and/or skin management components.

Referring now to FIG. 8, an example of a LISM material 82 disposed on razor cartridge components, specifically the two blade retaining clips 29 of FIG. 2 are shown in accordance with another embodiment of the present invention. The clips 29 are generally made of a metal. The metal may be comprised of aluminum. The shaving benefits of glide and comfort along the shave path may be augmented by adding the LISM material (e.g., a lubricious material) on the upper surface 82a of the clips 29 which are generally disposed on the left and right sides of the cartridge. The LISM material 82 may be deposited by means of dipping or spraying or by any method described herein or other feasible methods.

Referring to FIG. 9, a razor 90 is shown having at least one LISM material 92 disposed on a substantial portion of a handle 24, such as on outer and/or inner grooves of grip portions in accordance with another embodiment of the present invention. The addition of a LISM coating, for instance, on any outer surface of the handle, such as the grip, power button, or bottom end, may improve anti-microbial properties acting as a barrier to the growth of bacteria, fungus, and other organisms on the razor handles themselves which in turn may provide a clean handle to a user's hands or skin. This may be a desirable benefit particularly to those users that replace razor cartridges but keep their handles (e.g., non-disposable razor users).

In FIG. 10, a razor cartridge 100 is shown having at least one LISM material 102 disposed on the exterior surface 105 guard 104 of the razor cartridge such that it forms a pattern 106 or graphic in accordance with another embodiment of the present invention. In this embodiment, the pattern 106 is a wavy or sinusoidal pattern of LISM material 102 disposed thereon. The guard material upon which the LISM layer is disposed is preferably an elastomeric material which may be flexible though it may be applied to a guard comprised of rigid, inflexible plastic as well. The LISM material 102 of the present invention may be disposed within the "valleys" of the fins (not shown). The presence of the LISM layer 102 on the fins generally provides some lubrication benefit to assist in glide over the skin while the fins themselves provide a stretch to the skin before the blades cut the hair.

As can be seen by the wide variety of embodiments provided, the present invention, by its innate broad applicability across many types of surfaces, provides the ability to effectively modulate friction and other attributes across many different razor components as desired, for instance, to potentially adapt razor components to each other or to adapt to different user requirements.

This balancing of friction across the razor cartridge and handle surfaces may be different for different groups of consumers or use conditions.

The present invention layer's ability to essentially adapt or tailor the friction in a particular location on the razor therefore is highly beneficial.

Furthermore, other attributes such as the aesthetic or other sensory attributes may be achievable and are contemplated by the present invention by the addition of a colored liquid or fragrances disposed within the LISM itself.

Beneficial attributes provided by the LISM of the present invention on razor components may be further augmented or capable of being maintained in the presence of other chemistries such as with shave preparation or other formulations (e.g., oils, waxes, skin conditioners) used in the hair removal or shaving regimen.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A razor apparatus comprising: at least one portion of at least one surface of at least one razor component having at least one layer of LISM material disposed thereon, wherein said at least one razor component comprises a razor blade having a tip, a blade edge, a blade body, and two flanks, wherein said at least one layer of LISM material is disposed only on the blade edge, the blade body, or both, and wherein at least one layer of a non-LISM material is disposed on the tip and the two flanks.

2. The razor apparatus of claim 1 wherein said razor apparatus further includes an at least one second razor component, the at least one second razor component comprises one or more of the following: a razor blade, each blade having a blade edge and a blade body, a blade support, a housing, a frame, a guard, a cap, a lubricating strip, a lubricating ring, a clip, a cartridge connecting structure, a handle, wherein the handle further comprises a button, a handle grip, or any combination thereof, wherein a second layer of LISM material is disposed on said at least one second razor component on a second surface.

3. The razor apparatus of claim 1 wherein said razor blade comprises an outer skin contacting surface, an inner surface, a sharpened substrate, or any combination thereof.

4. The razor apparatus of claim 2 wherein said second surface is comprised of a polymeric material, an elastomeric material, a hard plastic material, a metal, an aluminum, a glass, a ceramic, or a combination of materials thereof.

5. The razor apparatus of claim 3 wherein said at least one layer of LISM layer is directly disposed on said razor blade substrate.

6. The razor apparatus of claim 2 wherein said at least one second razor component is the frame and the frame is made of a hard plastic and said second layer of LISM material is disposed on an outer surface of said frame.

7. The razor apparatus of claim 1, wherein said at least one layer of LISM material is disposed directly on a substrate of said blade body, on top of one or more interlayers deposited on said substrate, or in between one or more outer layers and said substrate.

8. The razor apparatus of claim 2 wherein said at least one second razor component is a blade support and said second layer of LISM material is disposed on an outer surface of said blade support.

9. The razor apparatus of claim 2 wherein said at least one second razor component is a guard and said second layer of LISM material is disposed on an outer surface of said guard.

10. The razor apparatus of claims 1 where said at least one LISM layer comprises a pattern or graphic.

11. The razor apparatus of claim 1 wherein the at least one LISM layer is disposed on the razor blade via impregnation of a liquid into a solid structure by dipping, spraying, brushing, molding, sintering, printing, etching, application via pad or paint, ink-jet nozzle, masking, or any combination thereof.

12. The razor apparatus of claim 1 wherein the coefficient of friction for said at least one LISM layer is about 50% less than that of an identical razor component without the LISM layer.

13. The razor apparatus of claim 1 wherein a portion of a fluid of said at least one LISM layer leaches.

14. The razor apparatus of claim 1 wherein each said at least one LISM layer provides a different coefficient of friction than said at least one layer of non-LISM material.

15. The razor apparatus of claim 2 wherein the second LISM layer is disposed on the second surface of said at least one second razor component via impregnation of a liquid into a solid structure by dipping, spraying, brushing, molding, sintering, printing, etching, application via pad or paint, ink-jet nozzle, masking, or any combination thereof.

* * * * *